(12) United States Patent
Sun et al.

(10) Patent No.: US 11,328,044 B2
(45) Date of Patent: May 10, 2022

(54) DYNAMIC RECOGNITION METHOD AND TERMINAL DEVICE

(71) Applicant: Huawei Technologies Co., Ltd., Shenzhen (CN)

(72) Inventors: Chi Wah Sun, Shenzhen (CN); Po Chin Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 194 days.

(21) Appl. No.: 16/479,424

(22) PCT Filed: May 27, 2017

(86) PCT No.: PCT/CN2017/086353
§ 371 (c)(1),
(2) Date: Jul. 19, 2019

(87) PCT Pub. No.: WO2018/133282
PCT Pub. Date: Jul. 26, 2018

(65) Prior Publication Data
US 2019/0362059 A1    Nov. 28, 2019

(30) Foreign Application Priority Data

Jan. 19, 2017   (CN) .......................... 201710044673.0

(51) Int. Cl.
*G06F 21/32*     (2013.01)
*G06F 21/45*     (2013.01)

(52) U.S. Cl.
CPC .............. *G06F 21/32* (2013.01); *G06F 21/45* (2013.01)

(58) Field of Classification Search
CPC ..... G06F 21/32; G06F 21/45; G06K 9/00288; G06K 9/6215
See application file for complete search history.

(56) References Cited

U.S. PATENT DOCUMENTS 6,205,424 B1 *   3/2001   Goldenthal ............. G10L 17/12
                                                    704/245
9,082,235 B2 *   7/2015   Lau ..................... G06K 9/00281
(Continued)

FOREIGN PATENT DOCUMENTS

CN       102034034 A      4/2011
CN       103761463 A      4/2014
(Continued)

OTHER PUBLICATIONS

Machine Translation and Abstract of Chinese Publication No. CN103761463, Apr. 30, 2014, 20 pages.
(Continued)

*Primary Examiner* — Tongoc Tran
(74) *Attorney, Agent, or Firm* — Conley Rose, P.C.

(57) ABSTRACT

A dynamic recognition method includes, when the terminal device detects that the user is in a first distance range, obtaining, by the terminal device, first feature information of the user. The method further includes performing first identity authentication on the first feature information of the user, where the first feature information includes facial feature information, voice feature information, or behavioral feature information. The method further includes increasing, by the terminal device, a level of a default threshold of second identity authentication when the first identity authentication succeeds. The method further includes, when the terminal device detects that the user is in a second distance range, obtaining, by the terminal device, second feature information of the user, and performing second identity authentication on the second feature information of the user based on the default threshold whose level is increased.

20 Claims, 10 Drawing Sheets

(56) References Cited

U.S. PATENT DOCUMENTS

| | | | | |
|---|---|---|---|---|
| 9,158,904 B1* | 10/2015 | Ross | .................. | G06K 9/00221 |
| 9,697,414 B2* | 7/2017 | Baldwin | ............ | G06K 9/00228 |
| 2001/0017584 A1 | 8/2001 | Shinzaki | | |
| 2013/0247175 A1* | 9/2013 | Nechyba | .................. | G06F 21/32 726/19 |
| 2014/0112553 A1* | 4/2014 | Yamaguchi | ........ | G06K 9/00362 382/118 |
| 2015/0249664 A1* | 9/2015 | Talhami | ................ | G06F 16/683 726/6 |
| 2016/0012217 A1 | 1/2016 | Wolf et al. | | |
| 2017/0091550 A1* | 3/2017 | Feng | .......................... | G06T 7/38 |
| 2017/0318014 A1* | 11/2017 | Korus | .................... | H04L 63/105 |
| 2020/0026939 A1* | 1/2020 | Sim | .................... | G06K 9/00288 |

FOREIGN PATENT DOCUMENTS

| | | |
|---|---|---|
| CN | 104933344 A | 9/2015 |
| CN | 104978510 A | 10/2015 |
| CN | 105635099 A | 6/2016 |
| CN | 106096585 A | 11/2016 |

OTHER PUBLICATIONS

Machine Translation and Abstract of Chinese Publication No. CN104978510, Oct. 14, 2015, 17 pages.

Machine Translation and Abstract of Chinese Publication No. CN105635099, Jun. 1, 2016, 28 pages.

Machine Translation and Abstract of Chinese Publication No. CN106096585, Nov. 9, 2016, 21 pages.

Foreign Communication From A Counterpart Application, PCT Application No. PCT/CN2017/086353, English Translation of International Search Report dated Aug. 18, 2017, 2 pages.

Foreign Communication From A Counterpart Application, PCT Application No. PCT/CN2017/086353, English Translation of Written Opinion dated Aug. 18, 2017, 4 pages.

Machine Translation and Abstract of Chinese Publication No. CN104933344, Sep. 23, 2015, 27 pages.

Foreign Communication From A Counterpart Application, Chinese Application No. 201780008004.6, Chinese Office Action dated Dec. 4, 2019, 8 pages.

* cited by examiner

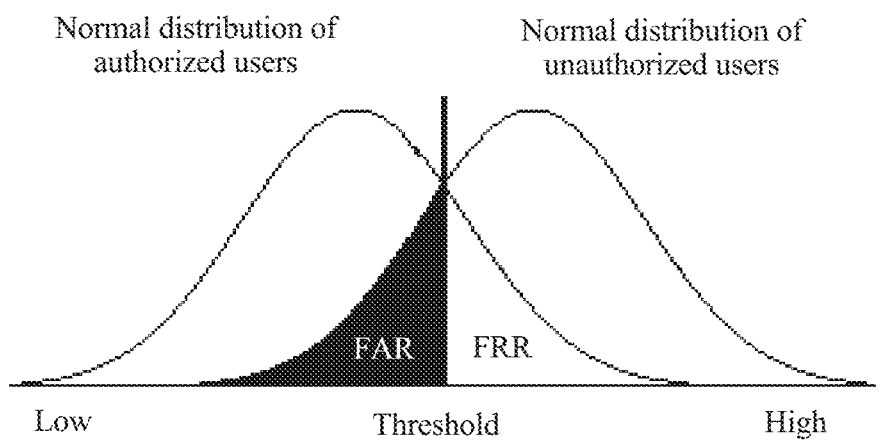
FIG. 3-a
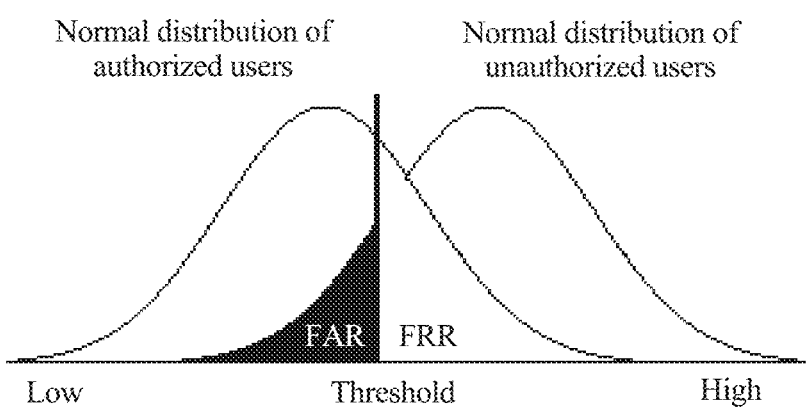
FIG. 3-b

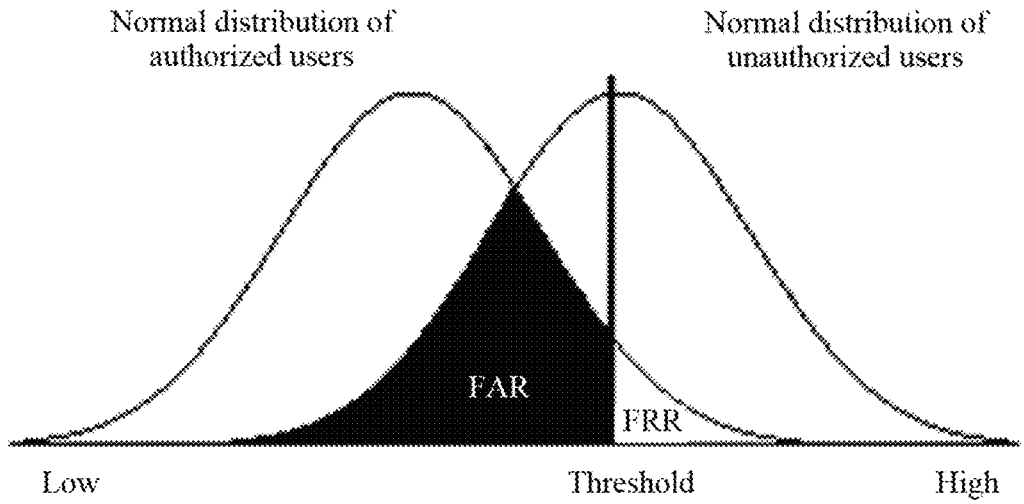

FIG. 3-c

| When a terminal device detects that a user is in a first distance range, the terminal device obtains first feature information of the user, and performs first identity authentication on the first feature information of the user, where the first feature information includes facial feature information, voice feature information, or behavioral feature information | — 101 |

↓

| The terminal device increases a level of a default threshold of second identity authentication when the first identity authentication succeeds | — 102 |

↓

| When the terminal device detects that the user is in a second distance range, the terminal device obtains second feature information of the user, and performs second identity authentication on the second feature information of the user based on the default threshold whose level is increased, where the second feature information includes iris feature information, and the second distance range is less than the first distance range | — 103 |

↓

| The terminal device performs an unlocking operation when the second identity authentication succeeds | — 104 |

FIG. 4

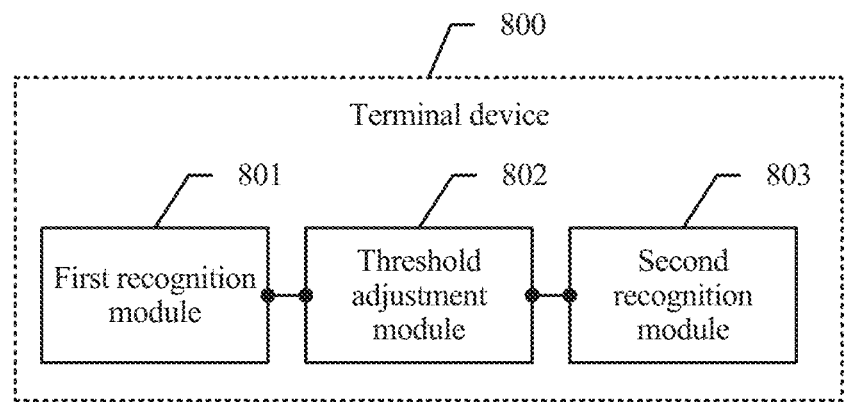
FIG. 8-a
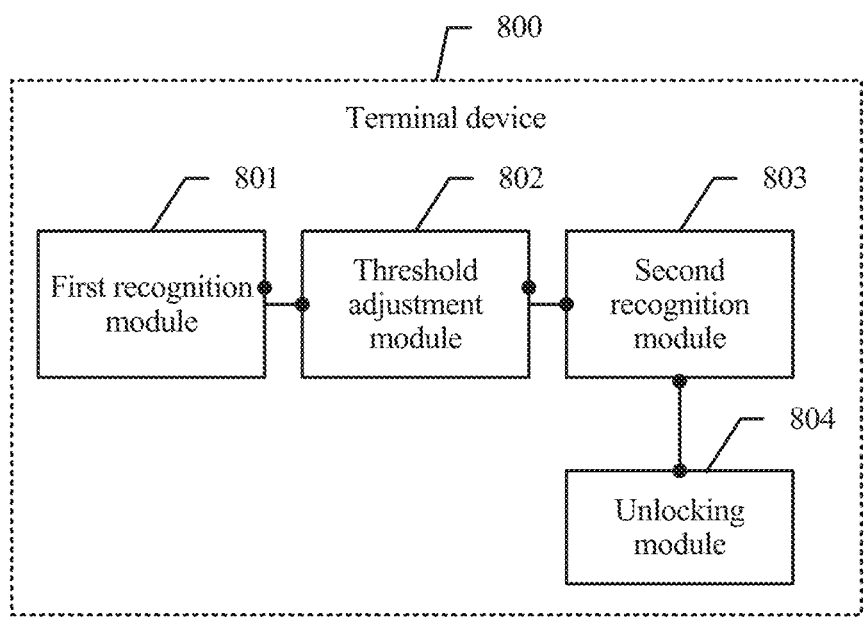
FIG. 8-b

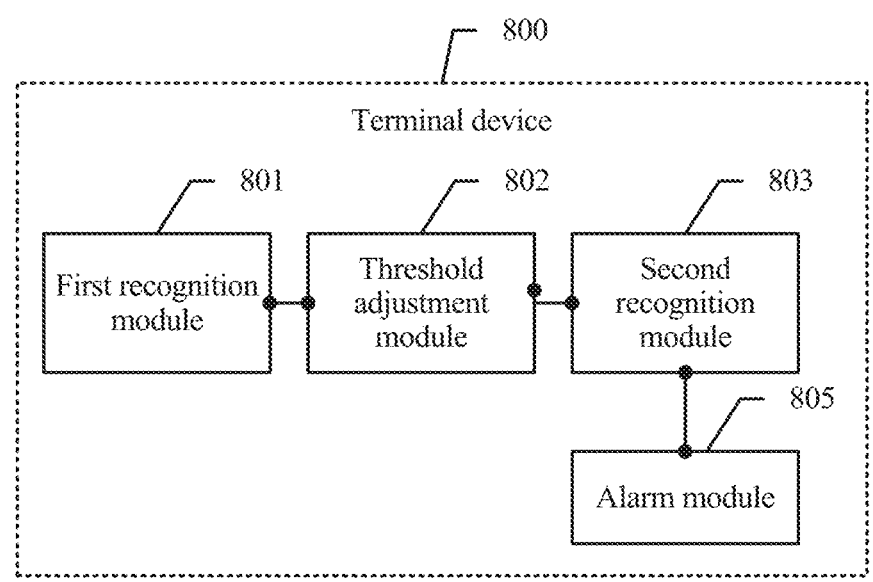
FIG. 8-c

DYNAMIC RECOGNITION METHOD AND TERMINAL DEVICE

CROSS-REFERENCE TO RELATED APPLICATIONS

This application is a national stage application of International Patent Application No. PCT/CN2017/086353, filed on May 27, 2017, which claims priority to Chinese Patent Application No. 201710044673.0, filed on Jan. 19, 2017. Both of the aforementioned applications are hereby incorporated by reference in their entireties.

TECHNICAL FIELD

Embodiments of this application relate to the communications field, and in particular, to a dynamic recognition method and a terminal device.

BACKGROUND

Recently, iris recognition is becoming a hot technology, and iris recognition has features of high precision and contactless convenience, and is being extended to application programs for user identity authentication and authorization on a mobile device and the like.

Although iris recognition has great advantages over other recognition manners, iris recognition has the following disadvantages when iris recognition is applied to a scanner: In the prior art, during iris recognition, a user needs to adjust a head location or an eye location of the user to adapt to a camera for image capture, and the user even needs to remove glasses to collect iris information.

Iris recognition is a biometric recognition method with high security, and uses a mathematical pattern recognition technology to recognize video images of one or both of irises (annular patterns around pupils) of eyes of a person, and a complex pattern of the iris is unique and stable. Currently, iris recognition requires the eye location of the user to be at a distance of 250 millimeters to 600 millimeters (mm) from an iris camera.

Currently, most deployed iris recognition systems obtain iris images through near infrared (Near Infrared, NIR) imaging, because near infrared imaging can block reflection of bright ambient light on a cornea lens and allow only those NIR wavelengths from a narrowband illuminator to return to an iris camera, so that a better image can be provided for recognition.

To achieve high recognition precision, in a current iris recognition solution, only a low error rate can be used to avoid falsely accepting an unauthorized user. When the low error rate is used, the iris recognition solution in the prior art further has the following problems: (1) A relatively long time needs to be used to recognize an authorized user, to meet a requirement of the low error rate. (2) To achieve high precision, the user cannot wear contact lenses or glasses, or have tears or long eyelashes, so that the iris camera obtains a pure image the same as that at the time of sampling. This increases a limitation on the user and causes inconvenience to the user. (3) The user further needs to adjust the eye location in real time to collect a relatively comprehensive iris image.

SUMMARY

Embodiments of this application provide a dynamic recognition method and a terminal device, to reduce a requirement for a user when the user is to be recognized, and improve overall recognition precision.

According to a first aspect, an embodiment of this application provides a dynamic recognition method, performed in a terminal device, where the following dynamic recognition method is triggered when the terminal device detects that a distance between a user and the terminal device is less than or equal to a first distance threshold, and the method includes: when the terminal device detects that the user is in a first distance range, obtaining, by the terminal device, first feature information of the user, and performing first identity authentication on the first feature information of the user, where the first feature information includes facial feature information, voice feature information, or behavioral feature information; increasing, by the terminal device, a level of a default threshold of second identity authentication when the first identity authentication succeeds; and when the terminal device detects that the user is in a second distance range, obtaining, by the terminal device, second feature information of the user, and performing second identity authentication on the second feature information of the user based on the default threshold whose level is increased, where the second feature information includes iris feature information, and the second distance range is less than the first distance range.

In this embodiment of this application, because the second distance range is less than the first distance range, when the user is relatively far away from the terminal device, preliminary first identity authentication may be first performed on the user, to compensate for overall recognition precision; and after the first identity authentication of the user succeeds, second identity authentication is further performed by using the default threshold whose level is increased, so that the user is more easily recognized, thereby reducing recognition duration of the second identity authentication. In this embodiment of this application, there are not excessive requirements for the user, to be specific, there is no need to adjust an eye location, the user does not need to remove contact lenses, glasses, tears, long eyelashes, or the like, and the user does not need to perform any specific action or enter any information. Therefore, perception-free recognition can be implemented, and overall user recognition precision can be improved by using a mutual combination of the first identity authentication and the second identity authentication.

In a possible design of the first aspect of this application, the method further includes: decreasing, by the terminal device, the level of the default threshold of the second identity authentication when the first identity authentication fails; and when the terminal device detects that the user is in the second distance range, obtaining, by the terminal device, the second feature information of the user, and performing second identity authentication on the second feature information of the user based on the default threshold whose level is decreased.

In this embodiment of this application, the first identity authentication is preliminary recognition. After the preliminary recognition of the user fails, the terminal device dynamically adjusts the default threshold of the second identity authentication in this embodiment of this application. The level of the default threshold of the second identity authentication needs to be decreased, so that it is more difficult to recognize the user through the second identity authentication. The default threshold is a recognition threshold used for the second identity authentication. Usually, a higher default threshold results in a greater possibility that the second identity authentication of the user succeeds. In other words, a higher recognition success rate results in a greater probability that a recognition error exists, and therefore security is lower. A lower default threshold results in a smaller possibility that the second identity authentication of the user succeeds. In other words, a lower recognition success rate results in a smaller probability that a recognition error exists, and therefore security is higher. The level of the default threshold is decreased. In this case, a recognition success rate is lower, and a probability that a recognition error exists is smaller. Therefore, recognition precision of the second identity authentication may be ensured, and more secure experience may be provided for the user.

In a possible design of the first aspect of this application, the decreasing, by the terminal device, the level of the default threshold of the second identity authentication includes: setting, by the terminal device, a first threshold level used to increase a false rejection rate FRR of the second identity authentication. In this embodiment of this application, through FAR decrease adjustment and FRR increase adjustment, the level of the default threshold of the second identity authentication can be adjusted in a decrease direction.

In a possible design of the first aspect of this application, when the first identity authentication fails, the method further includes: when the terminal device detects that the user is in the second distance range, obtaining, by the terminal device, the second feature information of the user, and performing second identity authentication on the second feature information of the user based on the default threshold of the second identity authentication.

In this embodiment of this application, the default threshold may not be adjusted. The terminal device retains the original default threshold used for the second identity authentication, and directly performs second identity authentication on the user by using the default threshold, so that the default threshold of the second identity authentication does not need to be modified, thereby simplifying an execution process of the terminal device.

In a possible design of the first aspect of this application, the increasing, by the terminal device, a level of a default threshold of second identity authentication includes: setting, by the terminal device, a second threshold level used to decrease an FRR of the second identity authentication. In this embodiment of this application, through FAR increase adjustment and FRR decrease adjustment, the level of the default threshold of the second identity authentication can be adjusted in an increase direction.

In a possible design of the first aspect of this application, the default threshold includes a recognition threshold level when the FRR and a FAR of the second identity authentication are equal. In this embodiment of this application, when the FRR and the FAR are equal, the second identity authentication has a lowest total error rate, and the default threshold of the second identity authentication may be set to the lowest total error rate in this scenario.

In a possible design of the first aspect of this application, the method further includes: performing, by the terminal device, an unlocking operation when the second identity authentication succeeds. In this embodiment of this application, the terminal device may be a mobile phone, a desktop computer, a notebook computer, an access control system, or the like. According to the dynamic recognition method provided in this embodiment of this application, the user may no longer need to perform any action or deliberately adjust a head location to cooperate with a camera. For example, the user only needs to naturally walk to a seat in front of a computer and then work. The dynamic recognition method provided in this embodiment of this application is further applied to user recognition (such as an automatic door system) at home or in an office. When the user walks from the first distance range into the second distance range, second identity authentication may be performed. After the authentication succeeds, an unlocking operation is performed, for example, a door automatically opens, to allow access of the user on which second identity authentication is successfully performed.

In a possible design of the first aspect of this application, the method further includes: sending, by the terminal device, an alarm message when the second identity authentication fails. The dynamic recognition method provided in this embodiment of this application may be applied to an implementation scenario of a "peeking alarm" or a "stranger following" alarm, to detect whether an unauthorized person is peeking at the user or a stranger is following the user. When the second identity authentication fails, the terminal device sends the alarm message for a warning function.

According to a second aspect, an embodiment of this application further provides a terminal device, where the terminal device is configured to: when detecting that a distance between a user and the terminal device is less than or equal to a first distance threshold, trigger sequential execution of the following modules: a first recognition module, configured to: when the terminal device detects that the user is in a first distance range, obtain first feature information of the user, and perform first identity authentication on the first feature information of the user, where the first feature information includes facial feature information, voice feature information, or behavioral feature information; a threshold adjustment module, configured to increase a level of a default threshold of second identity authentication when the first identity authentication succeeds; and a second recognition module, configured to: when the terminal device detects that the user is in a second distance range, obtain second feature information of the user, and perform second identity authentication on the second feature information of the user based on the default threshold whose level is increased, where the second feature information includes iris feature information, and the second distance range is less than the first distance range.

In this embodiment of this application, because the second distance range is less than the first distance range, when the user is relatively far away from the terminal device, preliminary first identity authentication may be first performed on the user, to compensate for overall recognition precision; and after the first identity authentication of the user succeeds, second identity authentication is further performed by using the default threshold whose level is increased, so that the user is more easily recognized, thereby reducing recognition duration of the second identity authentication. In this embodiment of this application, there are not excessive requirements for the user, to be specific, there is no need to adjust an eye location, the user does not need to remove contact lenses, glasses, tears, long eyelashes, or the like, and the user does not need to perform any specific action or enter any information. Therefore, perception-free recognition can be implemented, and overall user recognition precision can be improved by using a mutual combination of the first identity authentication and the second identity authentication.

In a possible design of the second aspect of this application, the threshold adjustment module is further configured to decrease the level of the default threshold of the second identity authentication when the first identity authentication fails; and the second recognition module is further configured to: when the terminal device detects that the user is in the second distance range, obtain the second feature information of the user, and perform second identity authentication on the second feature information of the user based on the default threshold whose level is decreased.

In this embodiment of this application, the first identity authentication is preliminary recognition. After the preliminary recognition of the user fails, the terminal device dynamically adjusts the default threshold of the second identity authentication in this embodiment of this application. The level of the default threshold of the second identity authentication needs to be decreased, so that it is more difficult to recognize the user through the second identity authentication. The default threshold is a recognition threshold used for the second identity authentication. Usually, a higher default threshold results in a greater possibility that the second identity authentication of the user succeeds. In other words, a higher recognition success rate results in a greater probability that a recognition error exists, and therefore security is lower. A lower default threshold results in a smaller possibility that the second identity authentication of the user succeeds. In other words, a lower recognition success rate results in a smaller probability that a recognition error exists, and therefore security is higher. The level of the default threshold is decreased. In this case, a recognition success rate is lower, and a probability that a recognition error exists is smaller. Therefore, recognition precision of the second identity authentication may be ensured, and more secure experience may be provided for the user.

In a possible design of the second aspect of this application, the threshold adjustment module is specifically configured to set a first threshold level used to increase a false rejection rate FRR of the second identity authentication. In this embodiment of this application, through FAR decrease adjustment and FRR increase adjustment, the level of the default threshold of the second identity authentication can be adjusted in a decrease direction.

In a possible design of the second aspect of this application, when the first identity authentication fails, the second recognition module is further configured to: when the terminal device detects that the user is in the second distance range, obtain the second feature information of the user, and perform second identity authentication on the second feature information of the user based on the default threshold of the second identity authentication.

In this embodiment of this application, the default threshold may not be adjusted. The terminal device retains the original default threshold used for the second identity authentication, and directly performs second identity authentication on the user by using the default threshold, so that the default threshold of the second identity authentication does not need to be modified, thereby simplifying an execution process of the terminal device.

In a possible design of the second aspect of this application, the threshold adjustment module is specifically configured to set a second threshold level used to decrease an FRR of the second identity authentication. In this embodiment of this application, through FAR increase adjustment and FRR decrease adjustment, the level of the default threshold of the second identity authentication can be adjusted in an increase direction.

In a possible design of the second aspect of this application, the terminal device further includes: an unlocking module, configured to perform an unlocking operation when the second identity authentication succeeds. In this embodiment of this application, the terminal device may be a mobile phone, a desktop computer, a notebook computer, an access control system, or the like. According to the dynamic recognition method provided in this embodiment of this application, the user may no longer need to perform any action or deliberately adjust a head location to cooperate with a camera. For example, the user only needs to naturally walk to a seat in front of a computer and then work. The dynamic recognition method provided in this embodiment of this application is further applied to user recognition (such as an automatic door system) at home or in an office. When the user walks from the first distance range into the second distance range, second identity authentication may be performed. After the authentication succeeds, an unlocking operation is performed, for example, a door automatically opens, to allow access of the user on which second identity authentication is successfully performed.

In a possible design of the second aspect of this application, the terminal device further includes: an alarm module, configured to send, by the terminal device, an alarm message when the second identity authentication fails. The dynamic recognition method provided in this embodiment of this application may be applied to an implementation scenario of a "peeking alarm" or a "stranger following" alarm, to detect whether an unauthorized person is peeking at the user or a stranger is following the user. When the second identity authentication fails, the terminal device sends the alarm message for a warning function.

According to a third aspect, an embodiment of this application further provides another terminal device, including a processor and a memory, where the processor and the memory communicate with each other by using a bus; the memory is configured to store a program, an instruction, and data; and the processor is configured to invoke the program, the instruction, and the data in the memory, to perform the method according to any one of the first aspect.

In the second aspect of this application, the processor of the terminal device may further perform the steps described in the first aspect and the various possible implementations. For details, refer to the descriptions in the first aspect and the various possible implementations.

A fourth aspect of this application provides a computer readable storage medium. The computer readable storage medium stores an instruction. When the instruction runs on a computer, the computer is enabled to perform the method in the foregoing aspects.

A fifth aspect of this application provides a computer program product that includes an instruction, and when the instruction runs on a computer, the computer is enabled to perform the method in the foregoing aspects.

BRIEF DESCRIPTION OF DRAWINGS

FIG. 3-a is a schematic diagram of distribution of an authorized user and an unauthorized user when a FAR and an FRR are equal according to an embodiment of this application;

FIG. 3-b is a schematic diagram of distribution of an authorized user and an unauthorized user when a level of a default threshold is decreased according to an embodiment of this application;

FIG. 3-c is a schematic diagram of distribution of an authorized user and an unauthorized user when a level of a default threshold is increased according to an embodiment of this application;

FIG. 4 is a schematic block diagram of a procedure of another dynamic recognition method according to an embodiment of this application;

FIG. 8-a is a schematic structural diagram of composition of a terminal device according to an embodiment of this application;

FIG. 8-b is a schematic structural diagram of composition of another terminal device according to an embodiment of this application;

FIG. 8-c is a schematic structural diagram of composition of another terminal device according to an embodiment of this application.

DESCRIPTION OF EMBODIMENTS

The embodiments of this application provide a dynamic recognition method and a terminal device, to reduce a requirement for a user when the user is to be recognized, and improve overall recognition precision.

The following describes the embodiments of this application with reference to the accompanying drawings.

The terms used in the embodiments of this application are merely for the purpose of illustrating specific embodiments, and are not intended to limit this application. The terms "a", "the", and "this" of singular forms used in the embodiments and the appended claims of this application are also intended to include plural forms, unless otherwise specified in the context clearly. It should also be understood that, the term "and/or" used in this specification indicates and includes any or all possible combinations of one or more associated listed items. The character "/" in this specification generally indicates an "or" relationship between the associated objects.

It should be understood that although terms "first", "second", "third", and the like may be used in the embodiments of this application to describe various messages, requests, and terminals, the messages, requests, and terminals are not limited by the terms. These terms are only used to differentiate between the messages, requests, and terminals. For example, without departing from the scope of the embodiments of this application, a first terminal may also be referred to as a second terminal, and similarly, the second terminal may also be referred to as the first terminal.

Depending on the context, for example, words "if" or "provided that" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

Figure 1:
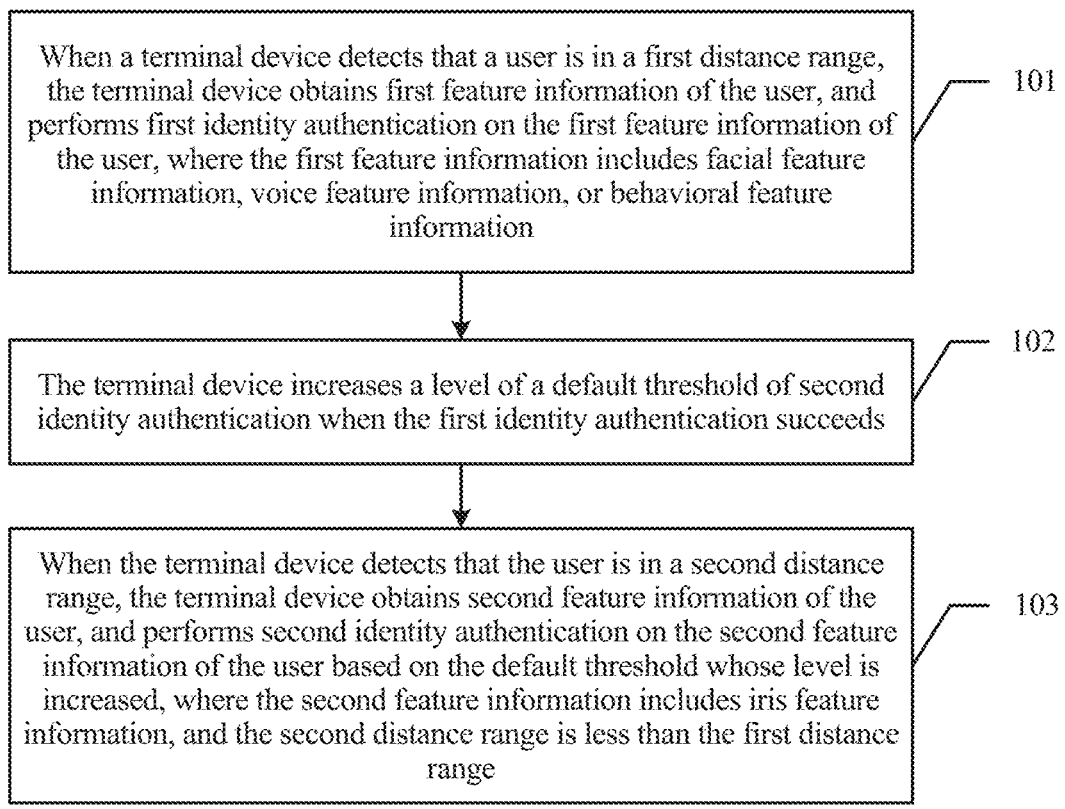
FIG. 1 is a schematic block diagram of a procedure of a dynamic recognition method according to an embodiment of this application.

Details are separately described below. An embodiment of a dynamic recognition method in this application may be applied to recognition and authentication performed by a terminal device on a user in a recognition system. The terminal device may be an electronic device such as a smartphone, a tablet computer, a computer, a multimedia player, or an electronic reader, or may be a smart household device such as a smart access control system. The following dynamic recognition method is triggered when the terminal device detects that a distance between the user and the terminal device is less than or equal to a first distance threshold, in other words, when the terminal device detects that the user is entering a first distance range. Referring to FIG. 1, the method may include the following steps.

101. When the terminal device detects that the user is in the first distance range, the terminal device obtains first feature information of the user, and performs first identity authentication on the first feature information of the user, where the first feature information includes facial feature information, voice feature information, or behavioral feature information.

In this embodiment of this application, the first distance range may be flexibly determined based on an application scenario. For example, the first distance range may also be referred to as a "medium- to long-distance recognition range". For example, the first distance range may be a distance of 600 millimeters (mm) to 2000 mm between the user and the terminal device. The first distance threshold may be set to 2000 mm, and a camera may be installed on the terminal device to track a movement distance of the user in real time. When a distance between the user and the camera is about 2000 mm, a dynamic recognition process performed in this embodiment of this application may be triggered. Without limitation, in this embodiment of this application, two distance endpoints of the first distance range may be flexibly set based on specific cases. For example, the first distance range may be from 500 mm to 1800 mm.

In this embodiment of this application, a face recognition apparatus, a voice recognition apparatus, and a behavior recognition apparatus may be built in the terminal device. When the terminal device detects that the user is in the first distance range, the terminal device obtains the first feature information of the user, and performs first identity authentication on the first feature information of the user. The first feature information includes the facial feature information, the voice feature information, or the behavioral feature information. Face recognition, voice recognition, and behavior recognition are less sensitive to a distance than iris recognition. When the user is in the first distance range, a feature of a face, a sound, or a body action of the user may be collected, to perform face recognition, voice recognition, or behavior recognition. Face recognition means that a facial feature of a face is collected from a video or an image for feature comparison, to classify the face. Voice recognition means that a sound feature is extracted from a collected sound for feature comparison, to classify the sound. During behavior recognition, an action and a behavior of a human body can be automatically recognized from a video or an image sequence, and the action and the behavior can be classified.

It should be noted that, in some embodiments of this application, when the first feature information collected by the terminal device meets a preset sample feature requirement, it may be determined that the first identity authentication succeeds; or when the first feature information collected by the terminal device does not meet a sample feature requirement, it may be determined that the first identity authentication fails. In this embodiment of this application, the first identity authentication performed by the terminal device does not need special cooperation of the user. For example, the user does not need to enter a password on the terminal device. This requires the user to cooperate with the terminal device to complete identity authentication, and therefore a requirement for the user is excessively high, thereby causing use inconvenience to the user. In this embodiment of this application, these processes in which the terminal device obtains the first feature information of the user and performs first identity authentication on the first feature information of the user are automatically performed by the terminal device without being perceived by the user, reducing dependency on the user. For example, the user does not need to manually enter a password or manually perform some specific actions. Therefore, in this embodiment of this application, a limitation on the user is reduced, and user identity recognition is completed without being perceived by the user.

102. The terminal device increases a level of a default threshold of second identity authentication when the first identity authentication succeeds.

In this embodiment of this application, when it is determined, through the first identity authentication in step 101, that the first identity authentication succeeds, step 102 may be performed. That the first identity authentication succeeds indicates that the user walking into the first distance range may be an authorized user. When the user is in the first distance range, the user may further move in a direction of approaching the terminal device. For example, the user may enter a second distance range. In step 101, the first identity authentication is preliminary recognition. After the preliminary recognition of the user succeeds, the terminal device dynamically adjusts the default threshold of the second identity authentication in this embodiment of this application. For example, the terminal device adjusts the level of the default threshold of the second identity authentication, so that a recognition success rate of the second identity authentication is increased. In this embodiment of this application, the level of the default threshold of the second identity authentication may be increased, so that the user is more easily recognized through the second identity authentication. The default threshold is a level of a recognition threshold used for the second identity authentication. Usually, a higher default threshold results in a greater possibility that the second identity authentication of the user succeeds. In other words, a higher recognition success rate results in a greater probability that a recognition error exists, and therefore security is lower. A lower default threshold results in a smaller possibility that the second identity authentication of the user succeeds. In other words, a lower recognition success rate results in a smaller probability that a recognition error exists, and therefore security is higher. For example, the default threshold may be a threshold of a total error rate of the second identity authentication. The level of the default threshold is increased through step 102. In this case, a recognition success rate is higher, and a probability that a recognition error exists is greater. In this embodiment of this application, the default threshold of the second identity authentication may be dynamically adjusted based on a recognition result of the first identity authentication performed by the terminal device, to reduce excessive requirements for the user during the second identity authentication in the prior art, thereby improving user recognition experience. If the authentication on the first feature information of the user succeeds, the level of the default threshold of the second identity authentication may be increased, so that an FRR can be decreased, thereby maximizing convenience for an authorized user.

In some embodiments of this application, the default threshold may include a recognition threshold level when the FRR and a FAR of the second identity authentication are equal. As shown in FIG. 3-a, the FRR is a measurement of a possibility that the terminal device fails to authenticate or recognize an authorized user, and the FAR is a measurement of a possibility that the terminal device falsely accepts an unauthorized user. When the FRR and the FAR are equal, the second identity authentication has a lowest total error rate, and the default threshold of the second identity authentication may be set to the lowest total error rate in this scenario.

In some embodiments of this application, step 102 in which the terminal device increases a level of a default threshold of second identity authentication includes the following step:

A1. The terminal device sets a second threshold level used to decrease an FRR of the second identity authentication.

As shown in FIG. 3-a and FIG. 3-c, the second threshold level may be set in FIG. 3-c, the second threshold level may increase the FAR of the second identity authentication, and the second threshold level may decrease the FRR of the second identity authentication. To be specific, the level of the default threshold needs to be moved in a direction of increasing a level shown in FIG. 3-a to a level shown in FIG. 3-c (in other words, rightwards). If the FRR is decreased to maximize convenience for the authorized user, the FAR is increased, where the FAR is inversely proportional to the FRR. The second threshold level is set, and may be used for FAR increase adjustment and FRR decrease adjustment, so that the level of the default threshold of the second identity authentication can be adjusted in an increase direction.

103. When the terminal device detects that the user is in a second distance range, the terminal device obtains second feature information of the user, and performs second identity authentication on the second feature information of the user based on the default threshold whose level is increased, where the second feature information includes iris feature information, and the second distance range is less than the first distance range.

Figure 2:
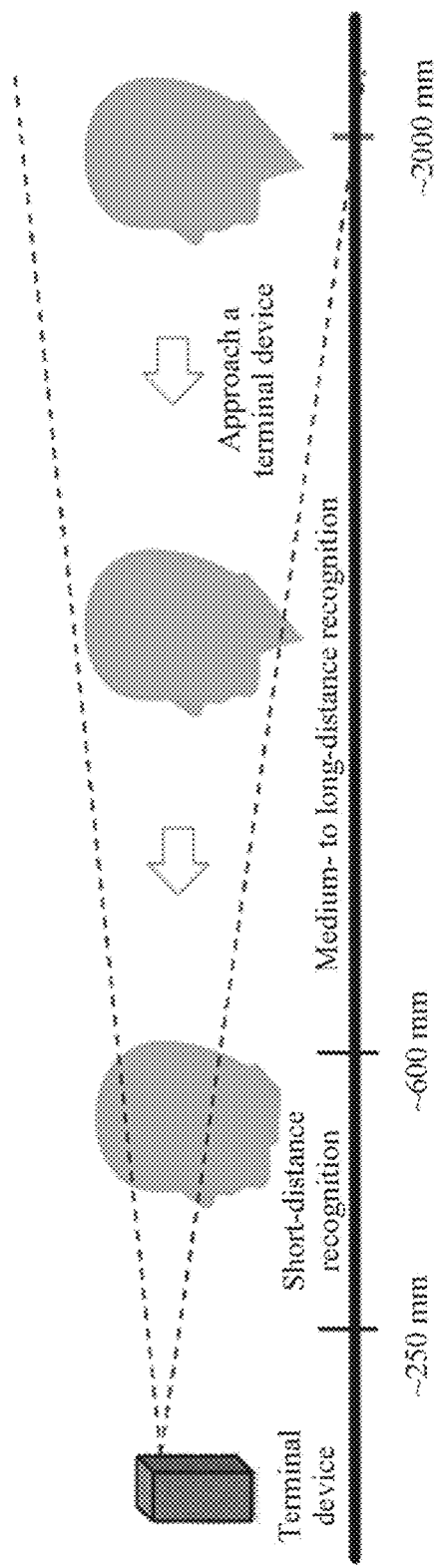
FIG. 2 is a schematic diagram in which a terminal device uses a double-recognition method in a process in which a user moves towards the terminal device according to an embodiment of this application.

In this embodiment of this application, after the terminal device increases the level of the default threshold of the second identity authentication, because the user is in a long-distance recognition range, the user may continue to move in a direction of approaching a location of the terminal device. If the user enters the second distance range, step 103 may be performed. The second distance range may be flexibly determined based on an application scenario. For example, the second distance range may also be referred to as a "short-distance recognition range". For example, the second distance range may be a distance of 250 mm to 600 mm between the user and the terminal device. The second distance threshold may be set to 600 mm, and a camera may be installed on the terminal device to track a movement distance of the user in real time. When a distance between the user and the camera is about 600 mm, a second identity authentication process performed in this embodiment of this application may be triggered. Without limitation, in this embodiment of this application, two distance endpoints of the second distance range may be flexibly set based on specific cases. For example, the second distance range may be from 200 mm to 550 mm. FIG. 2 is a schematic diagram in which a terminal device uses a double-recognition method in a process in which a user moves towards the terminal device. It may be understood that an interval size of the first distance range and that of the second distance range may be flexibly adjusted. Herein, the interval sizes are merely examples for description, and are not construed as limitations on this application.

In this embodiment of this application, when the terminal device detects that the user is in the second distance range, the terminal device performs second identity authentication on the second feature information of the user by using the default threshold whose level is increased. The second feature information includes the iris feature information. In this case, the second identity authentication is iris recognition. Because the level of the default threshold is increased, the terminal device may quickly recognize the user, without a need to collect an iris image of the user a plurality of times. Therefore, less time is consumed. Without limitation, in some embodiments of this application, alternatively, the second feature information may include voice feature information, and in this scenario, the second identity authentication may be specifically voice feature recognition.

It should be noted that, in this embodiment of this application, the terminal device uses a double-recognition manner. Although an increase in the default threshold of the second identity authentication increases a probability of a recognition error, in this embodiment of this application, the default threshold of the second identity authentication is increased only when the first identity authentication succeeds. Therefore, generally, user recognition precision is still very high. Because the default threshold of the second identity authentication is increased, strict requirements for the user are reduced, to be specific, the user does not need to adjust an eye location, and the user does not need to remove contact lenses, glasses, tears, long eyelashes, or the like. Perception-free recognition can be implemented for the user, and overall user recognition precision can be improved by using a mutual combination of the first identity authentication and the second identity authentication.

For example, the terminal device starts the recognition process when the user enters a medium to long recognition range (for example, 600 mm to 2000 mm). For example, for face recognition, the terminal device attempts to capture a facial image of the user and performs the recognition process. If the terminal device recognizes the user, the terminal device instructs to set a relatively high default threshold (Threshold) for short-distance recognition. The relatively high default threshold may help recognize the user. For example, after the user is recognized through the face, a relatively low FRR is set, so that the user is more easily recognized when short-distance recognition is performed. If the user cannot be recognized during medium- to long-distance recognition, the default threshold and an optimized default threshold continue to be used for short-distance recognition.

Next, an example in which the second identity authentication provided in this embodiment of this application is specifically iris recognition is used for description. Iris recognition is determining an identity of a person by comparing similarities between iris image features. A process of an iris recognition technology usually includes the following steps:

1. Photograph an entire eye of a person by using a specific camera device, and transmit a photographed iris image to an iris recognition system for image preprocessing.

2. Perform the following image preprocessing on the obtained iris image, to enable the iris image to meet a requirement for extracting an iris feature. First, iris location is performed to determine a location of an inner circle, a location of an outer circle, and a location of a quadratic curve in the image. The inner circle is a boundary between the iris and a pupil, the outer circle is a boundary between the iris and a sclera, and the quadratic curve is a boundary between the iris and each of an upper eyelid and a lower eyelid. Then, the iris image is normalized to adjust a size of the iris in the image to a fixed size set in the recognition system. Finally, image enhancement is performed. Luminance processing, contrast processing, smoothness processing, and the like are performed on the normalized iris image to improve a recognition rate of iris information in the image.

3. Extract, from the iris image by using a specific algorithm, a feature point required for iris recognition, and encode the feature point. For example, the eye is first positioned, corresponding edges are detected, and then a valid area is extracted and converted into a two-dimensional array form.

4. Match feature code obtained through feature extraction with iris image feature code in a database one by one, to determine whether the iris is the same as that in the database, to achieve an identity recognition purpose.

In some other embodiments of this application, the following dynamic recognition method is triggered when a terminal device detects that a user is entering a first distance range. As shown in FIG. 4, the method may include the following steps:

101. When the terminal device detects that the user is in the first distance range, the terminal device obtains first feature information of the user, and performs first identity authentication on the first feature information of the user, where the first feature information includes facial feature information, voice feature information, or behavioral feature information.

102. The terminal device increases a level of a default threshold of second identity authentication when the first identity authentication succeeds.

103. When the terminal device detects that the user is in a second distance range, the terminal device obtains second feature information of the user, and performs second identity authentication on the second feature information of the user based on the default threshold whose level is increased, where the second feature information includes iris feature information, and the second distance range is less than the first distance range.

For descriptions of step 101 step 103, refer to the detailed description in the foregoing embodiment.

104. The terminal device performs an unlocking operation when the second identity authentication succeeds.

For example, the terminal device may be a mobile phone, a desktop computer, a notebook computer, an access control system, or the like. According to the dynamic recognition method provided in this embodiment of this application, the user may no longer need to perform any action or deliberately adjust a head location to cooperate with a camera. For example, the user only needs to naturally walk to a seat in front of a computer and then work. The dynamic recognition method provided in this embodiment of this application is further applied to user recognition (such as an automatic door system) at home or in an office. When the user walks from the first distance range into the second distance range, second identity authentication may be performed. After the authentication succeeds, an unlocking operation is performed, for example, a door automatically opens, to allow access of the user on which second identity authentication is successfully performed.

Figure 5:
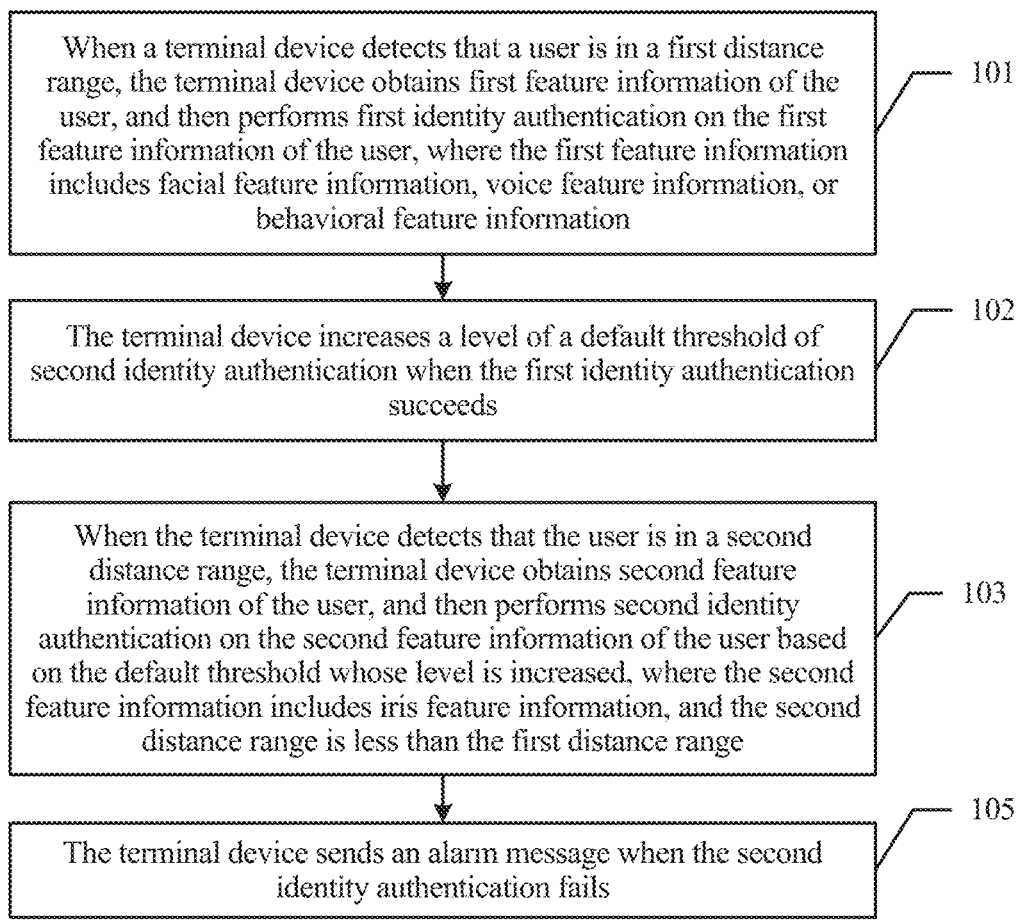
FIG. 5 is a schematic block diagram of a procedure of another dynamic recognition method according to an embodiment of this application.

In some other embodiments of this application, the following dynamic recognition method is triggered when a terminal device detects that a user is entering a first distance range. As shown in FIG. 5, the method may include the following steps:

101. When the terminal device detects that the user is in the first distance range, the terminal device obtains first feature information of the user, and performs first identity authentication on the first feature information of the user, where the first feature information includes facial feature information, voice feature information, or behavioral feature information.

102. The terminal device increases a level of a default threshold of second identity authentication when the first identity authentication succeeds.

103. When the terminal device detects that the user is in a second distance range, the terminal device obtains second feature information of the user, and performs second identity authentication on the second feature information of the user based on the default threshold whose level is increased, where the second feature information includes iris feature information, and the second distance range is less than the first distance range.

For descriptions of step 101 to step 103, refer to the detailed description in the foregoing embodiment.

105. The terminal device sends an alarm message when the second identity authentication fails.

The dynamic recognition method provided in this embodiment of this application may be applied to an implementation scenario of a "peeking alarm" or a "stranger following (Piggy Back)" alarm, to detect whether an unauthorized person is peeking at the user or a stranger is following the user. When the second identity authentication fails, the terminal device sends the alarm message for a warning function.

Figure 6:
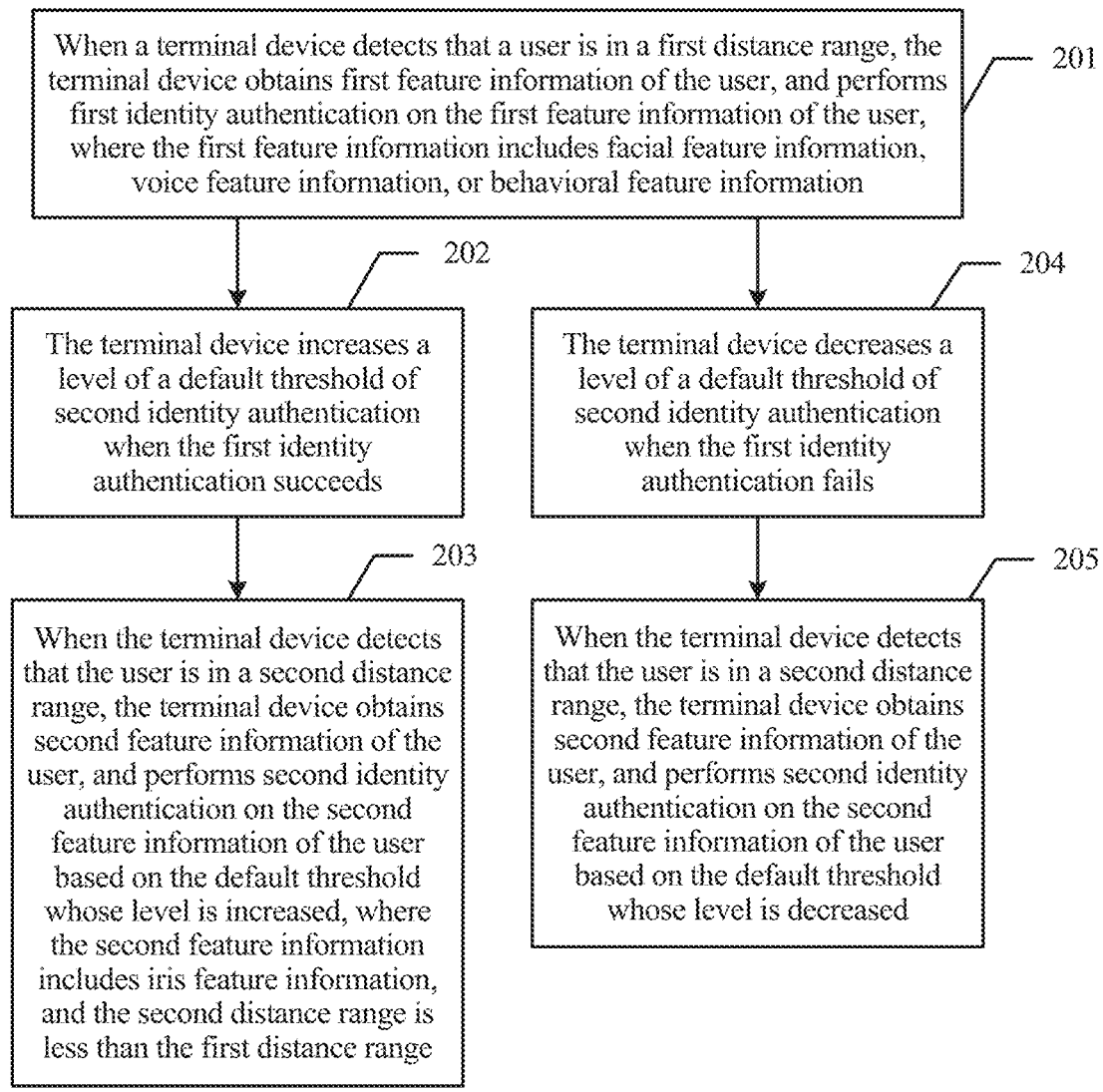
FIG. 6 is a schematic block diagram of a procedure of another dynamic recognition method according to an embodiment of this application.

In some other embodiments of this application, the following dynamic recognition method is triggered when a terminal device detects that a user is entering a first distance range. As shown in FIG. 6, the method may include the following step:

201. When the terminal device detects that the user is in the first distance range, the terminal device obtains first feature information of the user, and performs first identity authentication on the first feature information of the user, where the first feature information includes facial feature information, voice feature information, or behavioral feature information.

Subsequent steps 202 and 203 are performed if the first identity authentication succeeds, or subsequent steps 204 and 205 are performed if the first identity authentication fails.

202. The terminal device increases a level of a default threshold of second identity authentication when the first identity authentication succeeds.

203. When the terminal device detects that the user is in a second distance range, the terminal device obtains second feature information of the user, and performs second identity authentication on the second feature information of the user based on the default threshold whose level is increased, where the second feature information includes iris feature information, and the second distance range is less than the first distance range.

For descriptions of step 201 to step 203, refer to the detailed descriptions of step 101 to step 103 in the foregoing embodiment.

204. The terminal device decreases a level of a default threshold of second identity authentication when the first identity authentication fails.

205. When the terminal device detects that the user is in a second distance range, the terminal device obtains second feature information of the user, and performs second identity authentication on the second feature information of the user based on the default threshold whose level is decreased.

In step 201, the first identity authentication is preliminary recognition. After the preliminary recognition of the user fails, the terminal device dynamically adjusts the default threshold of the second identity authentication in this embodiment of this application. For example, the terminal device adjusts the level of the default threshold of the second identity authentication, so that a recognition success rate of the second identity authentication is decreased. In this embodiment of this application, the level of the default threshold of the second identity authentication may be decreased, so that it is more difficult to recognize the user through the second identity authentication. The default threshold is a recognition threshold used for the second identity authentication. Usually, a higher default threshold results in a greater possibility that the second identity authentication of the user succeeds. In other words, a higher recognition success rate results in a greater probability that a recognition error exists, and therefore security is lower. A lower default threshold results in a smaller possibility that the second identity authentication of the user succeeds. In other words, a lower recognition success rate results in a smaller probability that a recognition error exists, and therefore security is higher. For example, the default threshold may be a threshold of a total error rate of the second identity authentication. The level of the default threshold is decreased through step 204. In this case, a recognition success rate is lower, and a probability that a recognition error exists is smaller. Therefore, recognition precision of the second identity authentication may be ensured, and more secure experience may be provided for the user. If the first identity authentication fails, the level of the default threshold of the second identity authentication is adjusted, so that a security level can be improved to prevent intrusion of an unauthorized user.

Further, in some embodiments of this application, step 204 in which the terminal device decreases a level of a default threshold of second identity authentication includes the following step:

B1. The terminal device sets a first threshold level used to increase an FRR of the second identity authentication.

As shown in FIG. 3-*a* and FIG. 3-*b*, the first threshold level may be set in FIG. 3-*b*, the first threshold level may decrease a FAR of the second identity authentication, and the first threshold level may increase the false rejection rate FRR of the second identity authentication. To be specific, the level of the default threshold needs to be moved in a direction of decreasing a level shown in FIG. 3-*a* to a level shown in FIG. 3-*b* (in other words, leftwards). If the FAR is decreased to prevent intrusion of an unauthorized user, the FRR is increased, where the FAR is inversely proportional to the FRR. The first threshold level is set, and may be used for FAR decrease adjustment and FRR increase adjustment, so that the level of the default threshold of the second identity authentication can be adjusted in a decrease direction.

In some other embodiments of this application, after step 201 is performed, if the first identity authentication fails, the following step C1 may be further performed: When the terminal device detects that the user is in the second distance range, the terminal device obtains the second feature information of the user, and performs second identity authentication on the second feature information of the user based on the default threshold of the second identity authentication.

In step 204, the default threshold of the second identity authentication is decreased. In an implementation scenario of step C1, the default threshold may not be adjusted. The terminal device retains the original default threshold used for the second identity authentication, and directly performs second identity authentication on the user by using the default threshold, so that the default threshold of the second identity authentication does not need to be modified, thereby simplifying an execution process of the terminal device.

It can be learned from illustration of this application in the foregoing embodiment that, in this embodiment of this application, when the terminal device detects that the user is in the first distance range, the terminal device obtains the first feature information of the user, and performs first identity authentication on the first feature information of the user. The first feature information includes the facial feature information, the voice feature information, or the behavioral feature information. The terminal device increases the level of the default threshold of the second identity authentication when the first identity authentication succeeds. When the terminal device detects that the user is in the second distance range, the terminal device obtains the second feature information of the user, and performs second identity authentication on the second feature information of the user based on the default threshold whose level is increased. The second feature information includes the iris feature information. Because the second distance range is less than the first distance range, when the user is relatively far away from the terminal device, preliminary first identity authentication may be first performed on the user, to compensate for overall recognition precision; and after the first identity authentication of the user succeeds, second identity authentication is further performed by using the default threshold whose level is increased, so that the user is more easily recognized, thereby reducing recognition duration of the second identity authentication. In this embodiment of this application, there are not excessive requirements for the user, to be specific, there is no need to adjust an eye location, the user does not need to remove contact lenses, glasses, tears, long eyelashes, or the like, and the user does not need to perform any specific action or enter any information. Therefore, perception-free recognition can be implemented, and overall user recognition precision can be improved by using a mutual combination of the first identity authentication and the second identity authentication.

To better understand and implement the foregoing solutions in the embodiments of this application, the following provides a detailed description by using an example of a corresponding application scenario.

Figure 7:
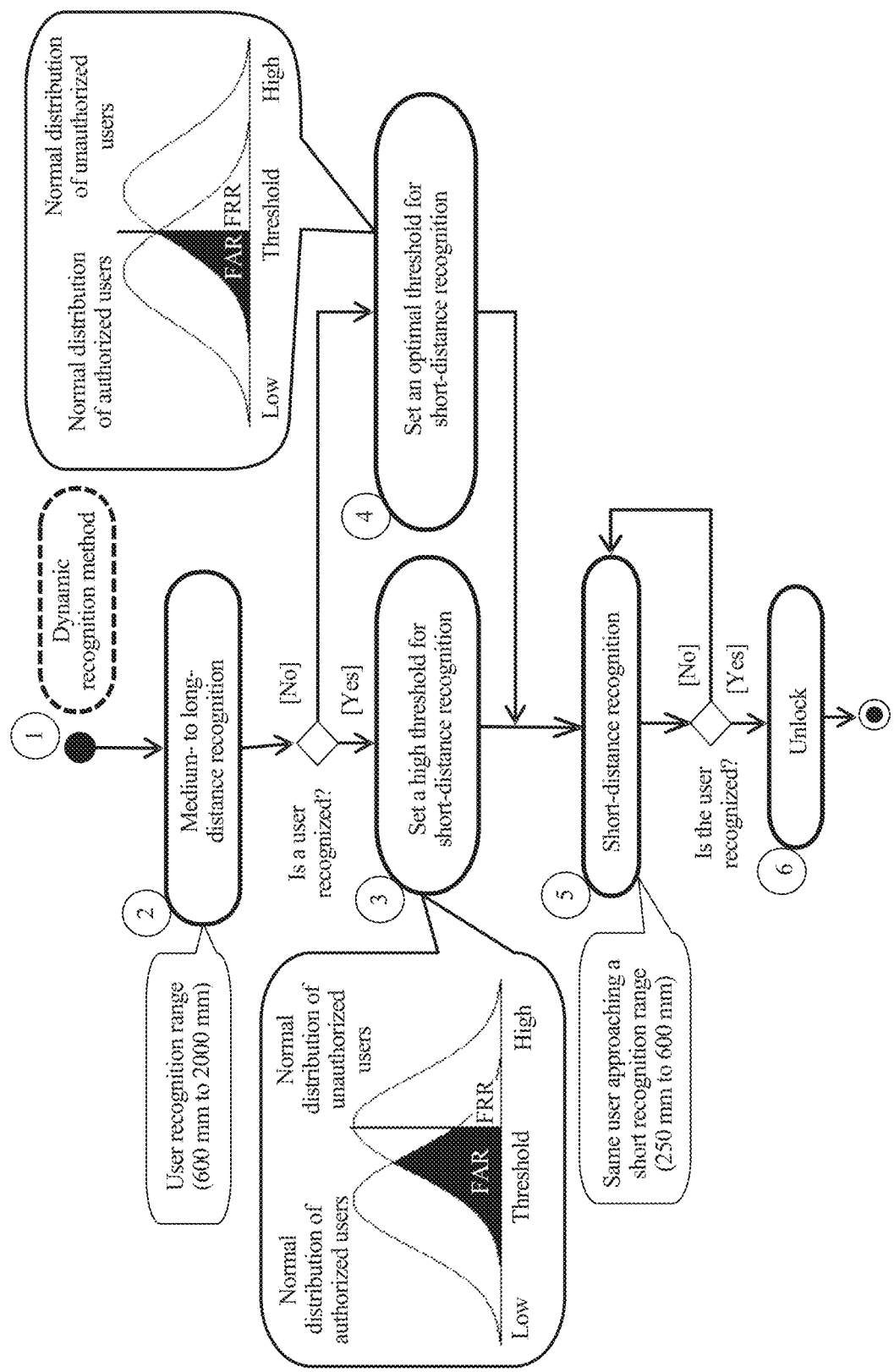
FIG. 7 is a schematic diagram of a process of performing a dynamic recognition method in an example scenario according to an embodiment of this application.
Figure 9:
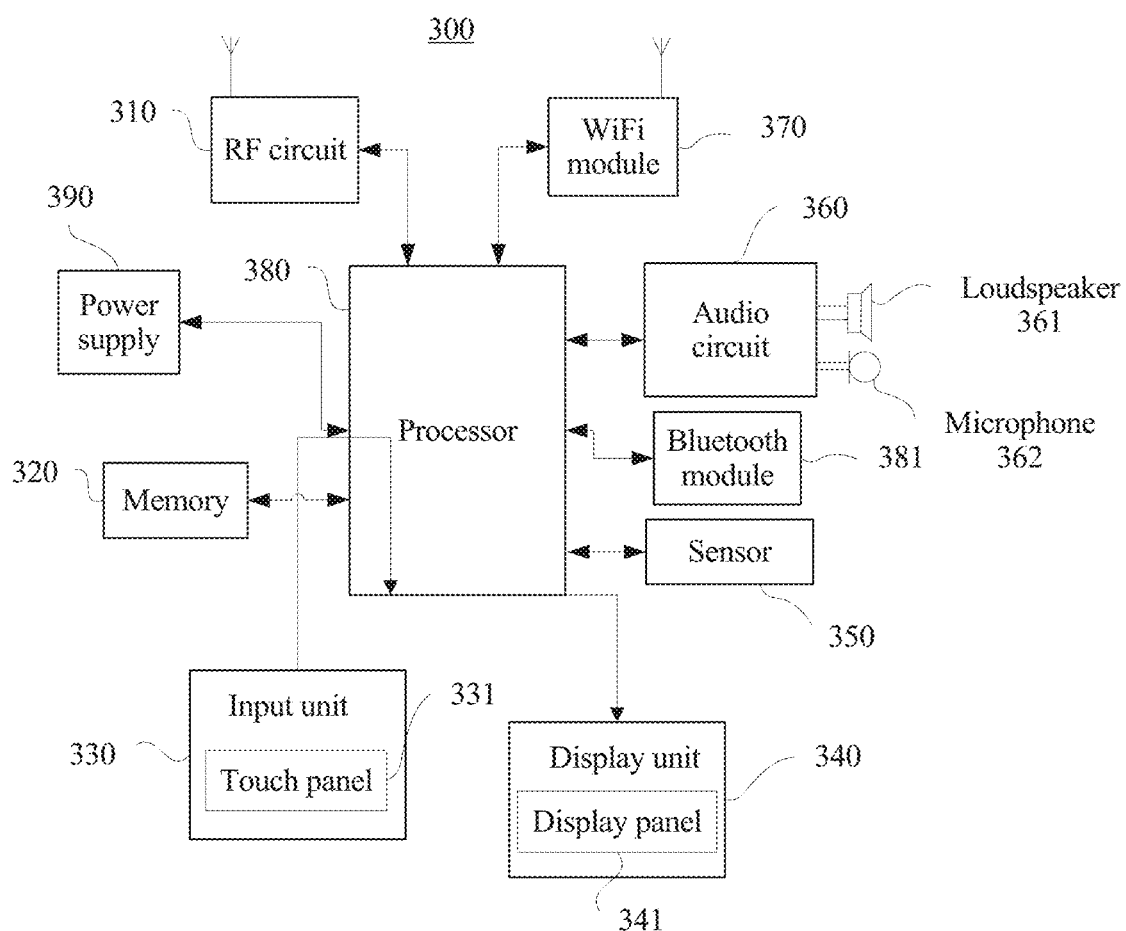
FIG. 9 is a schematic structural diagram of composition of another terminal device according to an embodiment of this application.

FIG. 7 is a schematic diagram of a process of performing a dynamic recognition method in an example scenario according to an embodiment of this application. In the dynamic recognition method provided in this embodiment of this application, for poor experience of using iris recognition by a user, by using an additional recognition technology (such as face recognition) in which pre-scanning is performed in a range of a medium distance to a long distance, preliminary recognition is performed on the user to compensate for overall recognition precision, and then iris recognition with a low FRR (namely, a high FAR) is performed for final recognition confirmation. Because face recognition is previously accepted, very high overall precision may be retained, and a FAR of the overall recognition precision in this embodiment of this application is less than 0.0001%.

In this embodiment of this application, when the user is walking towards a terminal device, for example, the user is at a distance of 600 millimeters to 2000 millimeters from the terminal device, a medium- to long-distance recognition system (such as face recognition, action recognition, and voice recognition) first performs pre-scanning. If the user can be confirmed, when the user walks into a second distance range (for example, a range between 250 millimeters and 600 millimeters), a low FRR value may be used to recognize the same user.

In the dynamic recognition method provided in this embodiment of this application, a large-range recognition capability is implemented, excellent dynamic user experience and speed and accuracy compensation are provided, and unlike the prior art, a low error rate does not need to be used to avoid falsely accepting an unauthorized user, thereby reducing a cumbersome action of a "chicken dance" (moving a head back and forth to adjust an eye location) of the user, relieving a user limitation, and achieving ultimate user experience of "perception-free recognition".

The following describes in detail the dynamic recognition method by using an example. The method mainly includes the following process:

(1) A dynamic recognition process is triggered when it is detected that the user is entering a first distance range.

(2) The terminal device starts the recognition process when the user enters a medium- to long-distance recognition range (for example, 600 mm to 2000 mm). For example, for face recognition, the terminal device attempts to capture a facial image of the user and performs the recognition process.

(3) If the terminal device recognizes the user, the terminal device instructs to set a relatively high threshold (Threshold) for second identity authentication, so that a relatively low FRR is used when second identity authentication is performed.

(4) If the user cannot be recognized during first identity authentication, a default threshold setting and an optimized threshold setting continue to be used when second identity authentication is performed. For example, an optimal threshold is used during the second identity authentication, to be specific, a minimum threshold level of either the FAR or the FRR is selected as the optimal threshold to obtain optimized precision; or a default threshold is used during the second identity authentication, and the default threshold may be used for the second identity authentication without any adjustment, thereby having a lowest total error rate.

(5) The terminal device starts a second identity authentication process when the user enters the second distance range (for example, 250 mm to 600 mm). For example, for iris recognition, the terminal device attempts to capture an eye image of the user and performs the recognition process. When the user is not recognized, iris recognition may be re-performed.

(6) An unlocking operation is performed when the user is recognized.

In an application scenario, when the user returns to a working location, the user can log in a computer device (such as a mobile phone, a desktop computer, or a notebook computer) through perception-free recognition. Through such dynamic recognition, the user may no longer need to perform any action or deliberately adjust a head location to cooperate with a recognition program. The user only needs to naturally walk to a seat in front of a computer and then work. Another application scenario is user recognition (such as an automatic door system) at home or in an office.

In this embodiment of this application, a double-recognition method is used to dynamically adjust a threshold level of a default threshold of the FAR/FRR. Ultimate user experience of "perception-free recognition" may be provided by using the dynamic recognition method provided in this embodiment of this application. The dynamic recognition method provided in this embodiment of this application may be applied to another scenario of a "peeking alarm" or a "stranger following" alarm, to detect whether an unauthorized person is peeking at the user or a stranger is following the user.

It should be noted that for brief description, the foregoing method embodiments are represented as a combination of a series of actions. However, a person skilled in the art should appreciate that this application is not limited to the described order of the actions, because based on this application, some steps may be performed in other orders or simultaneously. It should be further appreciated by a person skilled in the art that the embodiments described in this specification all belong to example embodiments, and the related actions and modules are not necessarily required by this application.

To better implement the foregoing solutions in the embodiments of this application, the following further provides a related apparatus configured to implement the foregoing solutions.

Referring to FIG. 8-*a*, an embodiment of this application provides a terminal device 800. The terminal device is configured to: when detecting that a distance between a user and the terminal device is less than or equal to a first distance threshold, trigger sequential execution of the following modules: a first recognition module 801, a threshold adjustment module 802, and a second recognition module 803.

The first recognition module 801 is configured to: when the terminal device detects that the user is in a first distance range, obtain first feature information of the user, and perform first identity authentication on the first feature information of the user, where the first feature information includes facial feature information, voice feature information, or behavioral feature information.

The threshold adjustment module 802 is configured to increase a level of a default threshold of second identity authentication when the first identity authentication succeeds.

The second recognition module 803 is configured to: when the terminal device detects that the user is in a second distance range, obtain second feature information of the user, and perform second identity authentication on the second feature information of the user based on the default threshold whose level is increased, where the second feature information includes iris feature information, and the second distance range is less than the first distance range.

In some embodiments of this application, the threshold adjustment module 802 is further configured to decrease the level of the default threshold of the second identity authentication when the first identity authentication fails.

The second recognition module 803 is further configured to: when the terminal device detects that the user is in the second distance range, obtain the second feature information of the user, and perform second identity authentication on the second feature information of the user based on the default threshold whose level is decreased.

In some embodiments of this application, the threshold adjustment module 802 is specifically configured to set a first threshold level used to increase a false rejection rate FRR of the second identity authentication.

In some embodiments of this application, when the first identity authentication fails, the second recognition module 803 is further configured to: when the terminal device detects that the user is in the second distance range, obtain the second feature information of the user, and perform second identity authentication on the second feature information of the user based on the default threshold of the second identity authentication.

In some embodiments of this application, the threshold adjustment module 802 is specifically configured to set a second threshold level used to decrease an FRR of the second identity authentication.

In some embodiments of this application, referring to FIG. 8-*b*, the terminal device 800 further includes: an unlocking module 804, configured to perform an unlocking operation when the second identity authentication succeeds.

In some embodiments of this application, referring to FIG. 8-*c*, the terminal device 800 further includes: an alarm module 805, configured to send, by the terminal device, an alarm message when the second identity authentication fails.

It should be noted that content such as information exchange and an execution process between the modules/units in the foregoing apparatuses is based on a same idea as that of the method embodiments of this application, and brings same technical effects as those brought by the method embodiments of this application. For specific content, refer to the descriptions in the foregoing shown method embodiments of this application. Details are not described herein again.

As shown in the foregoing figure, the foregoing figure is a structural diagram of hardware of a terminal device (such as a mobile phone or a tablet computer) that can implement the solutions of the foregoing embodiments of the present invention. It should be understood that a terminal device 300 shown in the figure is merely an example, and the terminal device 300 may have more or fewer components than those shown in the figure, may combine two or more components, or may have different component configurations. Various components shown in the figure may be implemented in hardware that includes one or more signal processors and/or application-specific integrated circuits, in software, or in a combination of hardware and software.

As shown in the figure, the terminal device 300 includes components such as an RF (Radio Frequency, radio frequency) circuit 310, a memory 320, an input unit 330, a display unit 340, a sensor 350, an audio circuit 360, a WiFi module 370, a processor 380, and a power supply 390. The processor 380 and the memory 320 communicate with each other by using a bus. A person skilled in the art may understand that, a structure of a mobile phone shown in FIG. 3 does not constitute a limitation on the mobile phone, and the mobile phone may include more or fewer components than those shown in the figure, combine some components, or have different component arrangements.

The following describes each composition component of the terminal device 300 in detail with reference to the foregoing figure.

The RF circuit 310 may be configured to receive and send a signal in an information receiving or sending process or a call process. In particular, after receiving downlink information of a base station, the RF circuit 310 sends the downlink information to the processor 380 for processing, and in addition, sends related uplink data to the base station. Usually, the RF circuit includes but is not limited to an antenna, at least one amplifier, a transceiver, a coupler, a low noise amplifier, a duplexer, and the like. In addition, the RF circuit 310 may further communicate with a network and another device through wireless communication. Any communications standard or protocol may be used for the wireless communication, and includes but is not limited to a Global System for Mobile Communications, a general packet radio service, Code Division Multiple Access, Wideband Code Division Multiple Access, Long Term Evolution, email, a short message service, and the like.

The memory 320 may be configured to store a software program, an instruction, and data. The processor 380 executes various functional applications of the terminal device 300 and data processing by running the software program and the data that are stored in the memory 320. The memory 320 may mainly include a program storage area and a data storage area. The program storage area may store an operating system, an application program required by at least one function (such as a sound playing function or an image playing function), and the like. The data storage area may store data (such as audio data or a phone book) created based on use of the mobile phone 300, and the like. In addition, the memory 320 may include a high-speed random access memory, and may further include a non-volatile memory, for example, at least one magnetic disk storage device, a flash storage device, or another volatile solid-state storage device. In this embodiment, the memory 320 stores an operating system that enables the terminal device 300 to run, for example, an iOS® operating system developed by Apple, an Android® open-source operating system developed by Google, or a Windows® operating system developed by Microsoft.

The input unit 330 may be configured to: receive entered digit or character information, and generate key signal input related to a user setting and function control of the mobile phone 300. Specifically, the input unit 330 may include a touch panel 331 and another input device 332. The touch panel 331, also referred to as a touchscreen, may collect a touch operation performed by a user on or near the touch panel (for example, an operation performed by the user on or near the touch panel 331 by using any suitable object or accessory such as a finger or a stylus), and may drive a corresponding connection apparatus according to a preset program. Optionally, the touch panel 331 may include two parts: a touch detection apparatus and a touch controller. The touch detection apparatus detects a touch location of the user, detects a signal brought by the touch operation, and transmits the signal to the touch controller. The touch controller receives touch information from the touch detection apparatus, converts the touch information into touch point coordinates, then sends the touch point coordinates to the processor 380, and can receive and perform a command sent by the processor 380.

The display unit 340 may be configured to display information entered by the user or information provided for the user and various menus of the mobile phone 300. The display unit 340 may include a display panel 341. Optionally, the display panel 341 may be configured in a form such as a liquid crystal display or an organic light-emitting diode. Further, the touch panel 331 may cover the display panel 341. When detecting the touch operation on or near the touch panel 331, the touch panel 331 transmits the touch operation to the processor 180 to determine a type of a touch event, and then the processor 380 provides corresponding visual output on the display panel 341 based on the type of the touch event. In FIG. 3, the touch panel 331 and the display panel 341 serve as two independent components to implement input and input functions of the terminal device 300. However, in some embodiments, the touch panel 331 and the display panel 341 may be integrated to implement the input and output functions of the terminal device 300.

The mobile phone 300 may further include at least one type of sensor 350, such as a fingerprint sensor 351, a sensor 352 used for iris recognition, a sensor 353 used for face recognition, a light sensor, a motion sensor, and other sensors. Specifically, the light sensor may include an ambient light sensor and a proximity sensor. The ambient light sensor may adjust brightness of the display pane 341 based on luminance of ambient light, and the proximity sensor may disable the display panel 341 and/or backlight when the terminal device 300 approaches an ear. As a motion sensor, an accelerometer sensor may detect a value of acceleration in each direction (usually, three axes), may detect a value and a direction of gravity in a static state, and may be used in an application that recognizes a mobile phone posture (such as screen switching between a landscape mode and a portrait mode, a related game, and magnetometer posture calibration), a function related to vibration recognition (such as a pedometer and a strike), and the like. Other sensors such as a gyroscope, a barometer, a hygrometer, a thermometer, and an infrared sensor may be further configured in the terminal device 300, and details are not described herein.

The audio circuit 360, a loudspeaker 361, and a microphone 362 may provide an audio interface between the user and the terminal device 300. The audio circuit 360 may convert received audio data into an electrical signal and transmit the electrical signal to the loudspeaker 361, and the loudspeaker 361 converts the electrical signal into a sound signal and outputs the sound signal. In addition, the microphone 362 converts the collected sound signal into an electrical signal, and the audio circuit 360 receives the electrical signal and converts the electrical signal into audio data, and outputs the audio data to the RF circuit 310 to send the audio data to, for example, another mobile phone, or outputs the audio data to the memory 320 for further processing.

WiFi is a short-distance wireless transmission technology. The terminal device 300 may help, by using the WiFi module 370, the user receive and send an email, browse a web page, access streaming media, and the like. The WiFi module 370 provides wireless broadband Internet access for the user.

The processor 380 is a control center of the terminal device 300, uses various interfaces and lines to connect various parts of the entire mobile phone, and executes various functions of the terminal device 300 and data processing by running or executing the software program stored in the memory 320 and by invoking the data stored in the memory 320, to perform overall monitoring on the mobile phone. In some embodiments, the processor 380 may include one or more processing units. An application processor and a modem processor may be integrated into the processor 380. The application processor mainly processes an operating system, a user interface, an application program, and the like. The modem processor mainly processes wireless communication. It may be understood that, alternatively, the modem processor may not be integrated into the processor 380. The processor 380 invokes the program, the instruction, and the data in the memory 320, to perform the foregoing shown method steps.

A Bluetooth module 381 is configured to exchange information with another device by using a short-distance communications protocol such as Bluetooth. For example, the terminal device 300 may establish, by using the Bluetooth module 381, a Bluetooth connection to a smartwatch that also has a Bluetooth module, thereby exchanging information.

The terminal device 300 further includes the power supply 390 (such as a battery) that supplies power to various components. The power supply may be logically connected to the processor 380 by using a power management system, to implement functions such as charging, discharging, and power consumption management by using the power management system.

Although not shown, the terminal device 300 may further include a camera and the like. Details are not described herein.

All the methods in the embodiments may be implemented in the terminal device 300 having the foregoing hardware structure.

Related parts of the method embodiments of this application may be mutually referenced. The apparatuses provided in the apparatus embodiments are configured to perform the methods provided in the corresponding method embodiments. Therefore, for the apparatus embodiments, refer to related parts in the related method embodiments for understanding.

Names of messages/frames, modules or units provided in the embodiments of this application are only examples, and other names may be used provided that functions of the messages/frames, the modules or units are the same.

A person of ordinary skill in the art should understand that all or some of the steps of the method in the foregoing embodiments may be implemented by a program instructing related hardware. The program may be stored in a readable storage medium of a device such as a FLASH or an EEPROM. When the program runs, all or some of the steps described above are performed.

In the foregoing specific implementations, the objectives, technical solutions, and beneficial effects of this application are further described in detail. It should be understood that different embodiments may be combined, and the foregoing descriptions are merely specific implementations of this application, but are not intended to limit the protection scope of this application. Any combination, modification, equivalent replacement, or improvement made without departing from the spirit and principle of this application shall fall within the protection scope of this application.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art may understand and implement the embodiments of the present invention without creative efforts.

Based on the descriptions of the foregoing implementations, a person skilled in the art may clearly understand that this application may be implemented by software in addition to necessary universal hardware, or certainly by dedicated hardware, including an application-specific integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. A dynamic recognition method implemented by a terminal device, the dynamic recognition method comprising:

collecting a sound recording or a video;

obtaining, based on the sound recording or the video, first feature information of a user, wherein the first feature information comprises voice feature information or behavioral feature information;

performing first identity authentication on the first feature information;

increasing a threshold level of a second identity authentication to an increased threshold level when the first identity authentication succeeds, wherein the increased threshold level is a recognition threshold level at which a false rejection rate (FRR) and a false acceptance rate (FAR) of the second identity authentication are equal, and wherein increasing the threshold level of the second identity authentication comprises decreasing a first setting corresponding to the FRR and increasing a second setting corresponding to the FAR;

subsequent to collecting the sound recording or the video, collecting an image;

obtaining, based on the image, second feature information of the user, wherein the second feature information comprises iris feature information; and performing the second identity authentication on the second feature information of the user based on the increased threshold level when the first identity authentication succeeds.

2. The dynamic recognition method of claim 1, further comprising:

decreasing the threshold level of the second identity authentication to a decreased threshold level when the first identity authentication fails; and performing the second identity authentication on the second feature information of the user based on the decreased threshold level when the first identity authentication fails.

3. The dynamic recognition method of claim 2, wherein decreasing the threshold level of the second identity authentication comprises increasing the first setting corresponding to the FRR.

4. The dynamic recognition method of claim 1, further comprising performing the second identity authentication on the second feature information of the user based on a default threshold of the second identity authentication.

5. The dynamic recognition method of claim 1, further comprising:

triggering performing the first identity authentication when the user is within a first distance range from the terminal device; and triggering performing the second identity authentication when the user is within a second distance range from the terminal device, wherein the first distance range is greater than the second distance range.

6. The dynamic recognition method of claim 1, further comprising:

determining that the user is within a first distance range from the terminal device;

responsive to determining that the user is within the first distance range:
 collecting the sound recording or the video;
 obtaining the first feature information; and
 performing the first identity authentication;

determining that the user is within a second distance range from the terminal device, wherein the second distance range is less than the first distance range; and responsive to determining that the user is within the second distance range:
 collecting the image;
 obtaining the second feature information; and
 performing the second identity authentication.

7. The dynamic recognition method of claim 2, further comprising performing an unlocking operation when the second identity authentication succeeds and the first identity authentication fails.

8. The dynamic recognition method of claim 1, further comprising sending an alarm message when the second identity authentication fails.

9. A terminal device, comprising:
a processor; and
a memory coupled to the processor and storing programming instructions that, when executed by the processor, cause the terminal device to:
 collect a sound recording or a video;
 obtain, based on the sound recording or the video, first feature information of a user, wherein the first feature information comprises voice feature information or behavioral feature information;
 perform first identity authentication on the first feature information of the user;
 increase a threshold level of a second identity authentication to an increased threshold level when the first identity authentication succeeds, wherein the increased threshold level is a recognition threshold level at which a false rejection rate (FRR) and a false acceptance rate (FAR) of the second identity authentication are equal, and wherein the threshold level of the second identity authentication is increased to the increased threshold level by decreasing a first setting corresponding to the FRR and increasing a second setting corresponding to the FAR;
 subsequent to collecting the sound recording or the video, collect an image;
 obtain, based on the image, second feature information of the user, wherein the second feature information comprises iris feature information; and
 perform the second identity authentication on the second feature information of the user based on the increased threshold level when the first identity authentication succeeds.

10. The terminal device of claim 9, wherein the programming instructions are further configured to cause the terminal device to:

decrease the threshold level of the second identity authentication to a decreased threshold level when the first identity authentication fails;

obtain the second feature information of the user; and perform the second identity authentication on the second feature information of the user based on the decreased threshold level when the first identity authentication fails.

11. The terminal device of claim 10, wherein the programming instructions are further configured to cause the terminal device to decrease the threshold level of the second identity authentication by causing the terminal device to increase the first setting corresponding to the FRR.

12. The terminal device of claim 9, wherein the programming instructions are configured to cause the terminal device to perform the second identity authentication on the second feature information of the user based on a default threshold of the second identity authentication.

13. The terminal device of claim 9, wherein the programming instructions are further configured to cause the terminal device to:

trigger the performance of the first identity authentication when the user is within a first distance range from the terminal device; and trigger the performance of the second identity authentication when the user is within a second distance range from the terminal device, wherein the first distance range is greater than the second distance range.

14. The terminal device of claim 9, wherein the program instructions are further configured to cause the terminal device to:

determine that the user is within a first distance range from the terminal device;

responsive to determining that the user is within the first distance range:
 collect the sound recording or the video;
 obtain the first feature information; and
 perform the first identity authentication;

determine that the user is within a second distance range from the terminal device, wherein the second distance range is less than the first distance range; and responsive to determining that the user is within the second distance range:
  collect the image;
  obtain the second feature information; and
  perform the second identity authentication.

15. The terminal device of claim 9, wherein the programming instructions are further configured to cause the terminal device to perform an unlocking operation when the second identity authentication succeeds.

16. The terminal device of claim 9, wherein the programming instructions are further configured to cause the terminal device to send an alarm message when the second identity authentication fails.

17. A non-transitory computer-readable storage medium having computer-readable program code stored therein that, when executed by a processor of an apparatus, causes the apparatus to:
  collect a sound recording or a video;
  obtain, based on the sound recording or the video, first feature information of a user, wherein the first feature information comprises voice feature information or behavioral feature information;
  perform first identity authentication on the first feature information of the user;
  increase a threshold level of a second identity authentication to an increased threshold level when the first identity authentication succeeds, wherein the increased threshold level is a recognition threshold level at which a false rejection rate (FRR) and a false acceptance rate (FAR) of the second identity authentication are equal, and wherein the threshold level of the second identity authentication is increased to the increased threshold level by decreasing a first setting corresponding to the FRR and increasing a second setting corresponding to the FAR;
  subsequent to collecting the sound recording or the video, collect an image;
  obtain, based on the image, second feature information of the user, wherein the second feature information comprises iris feature information; and
  perform the second identity authentication on the second feature information of the user based on the increased threshold level when the first identity authentication succeeds.

18. The non-transitory computer-readable storage medium of claim 17, wherein the computer-readable program code is further configured to cause the apparatus to:
  decrease the threshold level of the second identity authentication to a decreased threshold level when the first identity authentication fails;
  obtain the second feature information of the user; and
  perform the second identity authentication on the second feature information of the user based on the decreased threshold level when the first identity authentication fails.

19. The non-transitory computer-readable storage medium of claim 18, wherein the computer-readable program code is further configured to cause the apparatus to decrease the threshold level by causing the apparatus to increase the first setting corresponding to the FRR.

20. The non-transitory computer-readable storage medium of claim 17, wherein the computer-readable program code is further configured to cause the apparatus to perform the second identity authentication on the second feature information of the user based on a default threshold of the second identity authentication.

* * * * *